(12) United States Patent
Lee

(10) Patent No.: US 9,058,432 B2
(45) Date of Patent: Jun. 16, 2015

(54) DATA TRANSFERRING CIRCUIT AND DATA TRANSFERRING/RECEIVING SYSTEM

(75) Inventor: Geun-Il Lee, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 633 days.

(21) Appl. No.: 13/334,208

(22) Filed: Dec. 22, 2011

(65) Prior Publication Data

US 2012/0254488 A1 Oct. 4, 2012

(30) Foreign Application Priority Data

Mar. 30, 2011 (KR) ........................ 10-2011-0028910

(51) Int. Cl.
G06F 13/12 (2006.01)
G06F 13/38 (2006.01)
H03M 9/00 (2006.01)

(52) U.S. Cl.
CPC ...................................... G06F 13/38 (2013.01)

(58) Field of Classification Search
CPC ... H03M 3/42; H03M 1/72; H03M 2201/422; H03M 2201/4216; H03M 2201/42225
USPC ..................... 710/71; 341/100, 101
See application file for complete search history.

(56) References Cited

U.S. PATENT DOCUMENTS

| 4,115,856 | A * | 9/1978 | Labeye-Voisin et al. ..... 710/106 |
| 6,502,212 | B1 * | 12/2002 | Coyle et al. ..................... 714/43 |
| 6,765,413 | B2 * | 7/2004 | Nakase ............................ 326/86 |
| 2005/0005046 | A1 * | 1/2005 | Bashirullah et al. .......... 710/100 |
| 2005/0125577 | A1 * | 6/2005 | Yusa ................................ 710/62 |
| 2005/0210162 | A1 * | 9/2005 | Noujeim ......................... 710/18 |
| 2009/0182918 | A1 * | 7/2009 | Hollis ........................... 710/106 |

FOREIGN PATENT DOCUMENTS

| KR | 100643498 | 11/2006 |
| KR | 1020100053202 | 5/2010 |
| KR | 1020100074823 | 7/2010 |
| KR | 10-2011-0120534 | 11/2011 |

OTHER PUBLICATIONS

Office Action issued from the Korean Intellectual Property Office on Aug. 31, 2012.
Notice of Allowance issued by the Korean Intellectual Property Office on Jan. 25, 2013.

* cited by examiner

*Primary Examiner* — Ernest Unelus
*Assistant Examiner* — Getente A Yimer
(74) *Attorney, Agent, or Firm* — IP & T Group LLP

(57) ABSTRACT

A data transferring circuit includes a data transferor configured to transfer data through a plurality of parallel data transfer lines, wherein the data transferor is further configured to partially invert the transferred data in response to an inversion signal, and a pattern sensor configured to enable the inversion signal when data transferred through the parallel data transfer lines is to cause three sequential lines to transfer data of a logic value through a middle one of the sequential lines and data of an inverse of the logic value through the remaining ones of the sequential lines or cause all of the transfer lines to transfer data of a same logic value.

17 Claims, 9 Drawing Sheets

| LINE_0 | LINE_1 | LINE_2 | LINE_3 | |
|---|---|---|---|---|
| 0 | 0 | 0 | 0 | ~101 |
| 0 | 0 | 0 | 1 | |
| 0 | 0 | 1 | 0 | ~102 |
| 0 | 0 | 1 | 1 | |
| 0 | 1 | 0 | 0 | ~103 |
| 0 | 1 | 0 | 1 | ~104 |
| 0 | 1 | 1 | 0 | |
| 0 | 1 | 1 | 1 | |
| 1 | 0 | 0 | 0 | |
| 1 | 0 | 0 | 1 | ~105 |
| 1 | 0 | 1 | 0 | ~106 |
| 1 | 0 | 1 | 1 | |
| 1 | 1 | 0 | 0 | |
| 1 | 1 | 0 | 1 | ~107 |
| 1 | 1 | 1 | 0 | |
| 1 | 1 | 1 | 1 | ~108 |

E: EVEN DATA
O: ODD DATA

DATA TRANSFERRING CIRCUIT AND DATA TRANSFERRING/RECEIVING SYSTEM

CROSS-REFERENCE TO RELATED APPLICATIONS

The present application claims priority of Korean Patent Application No. 10-2011-0028910, filed on Mar. 30, 2011, which is incorporated herein by reference in its entirety.

BACKGROUND

1. Field

Exemplary embodiments of the present invention relate to a technology for transferring and receiving data.

2. Description of the Related Art

Generally, jitter components affecting high-speed data transfer include cross talk noise and inductive noise.

FIG. 1 illustrates a case where cross talk noise and inductive noise occur at a plurality of parallel lines LINE0 to LINE3, through which data are transferred.

Cross talk is caused due to capacitor components generated between two adjacent lines. Cross talk becomes more pronounced when the data of the adjacent two lines has an opposite logic value to the data of the central line. The data pattern of this case is referred to as a two-aggressor-one-victim pattern. The reference numerals '102', '103', '104', '105', '106', and '107' of FIG. 1 indicate the two-aggressor-one-victim pattern. Referring to the reference numeral '102', since a data '1' of a third line LINE2 has an opposite logic value to the data '0' of second and fourth lines LINE1 and LINE3, it is difficult to keep the data of the third line LINE2 at the value of '1' due to the influence of the second and fourth lines LINE1 and LINE3.

Inductive noise becomes more pronounced when the data of several lines transition simultaneously. This noise is referred to as Simultaneous Switching Output (SSO) noise. The reference numerals '101' and '108' of FIG. 1 show a pattern when the data of first to fourth lines LINE0 to LINE3 are the same and the SSO noise becomes big.

As the data transfer rate at which the data transferring within diverse integrated circuit chip such as a memory and Central Processing Unit (CPU) and the data transferring between integrated circuit chips increase, a method for reducing cross talk noise and SSO noise for high-speed data transfer is useful.

SUMMARY

An embodiment of the present invention is directed to reducing cross talk noise and Simultaneous Switching Output (SSO) noise during data transfer.

In accordance with an embodiment of the present invention, a data transferring circuit includes: a data transferor configured to transfer data through a plurality of parallel data transfer lines, wherein the data transferor is further configured to partially invert the transferred data in response to an inversion signal; and a pattern sensor configured to enable the inversion signal when data transferred through the parallel data transfer lines is to cause three sequential lines to transfer data of a logic value through a middle one of the sequential lines and data of an inverse of the logic value through the remaining ones of the sequential lines or cause all of the transfer lines to transfer data of a same logic value.

In accordance with another embodiment of the present invention, a data transferring/receiving system may include: a data transferring circuit including a data transferor configured to transfer data through a plurality of parallel data transfer lines, wherein the data transferor is further configured to partially invert the transferred data in response to an inversion signal, a pattern sensor configured to enable the inversion signal when data transferred through the parallel data transfer lines is to cause three sequential lines to transfer data of a logic value through a middle one of the sequential lines and data of an inverse of the logic value through the remaining ones of the sequential lines or cause all of the transfer lines to transfer data of a same logic value, and an inversion information transferor configured to transfer the inversion signal through an inversion information transfer line; and a data receiving circuit configured to invert the inverted data received from the data transferor in response to the inversion signal.

In accordance with yet another embodiment of the present invention, a data transferring circuit may include: a first pattern sensor configured to enable an even inversion signal when even data of low nibble data have a two-aggressor-one-victim pattern or have the same value; a second pattern sensor configured to enable an odd inversion signal when odd data of high nibble data have a two-aggressor-one-victim pattern or have the same value; a first data transferor configured to transfer the low nibble data through a plurality of first data transfer lines, where a portion of the even data of the low nibble data is inverted or not inverted in response to the even inversion signal before being transferred; a second data transferor configured to transfer the high nibble data through a plurality of second data transfer lines, where a portion of the odd data of low nibble data is inverted or not inverted in response to the odd inversion signal before being transferred; and an inversion information transferor configured to alternately transfer the even inversion signal and the odd inversion signal through an inversion information transfer line.

In accordance with still another embodiment of the present invention, a data transfer system includes a data transferring circuit for transferring data through a plurality of parallel data transfer lines and a data receiving circuit for receiving data through the parallel data transfer lines, wherein, when data to be loaded on the parallel data transfer lines is to cause three sequential ones of the parallel data transfer lines to transfer data of a logic value through a middle one of the three sequential lines of the parallel data transfer lines and data of an inverse of the logic value to be transferred through remaining sequential lines of the parallel data transfer lines or cause all of the transfer lines to transfer data of a same logic value, the data transferring circuit is configured to partially invert the transferred data and transfer an inversion signal for informing a transfer of the inverted data through an inversion information transfer line, and the data receiving circuit is configured to receive transferred data through the data transfer lines, receive the inversion signal through the inversion information transfer line, and invert the inverted data received from the data transferring circuit in response to the inversion signal.

DETAILED DESCRIPTION

Figures 1, 2:
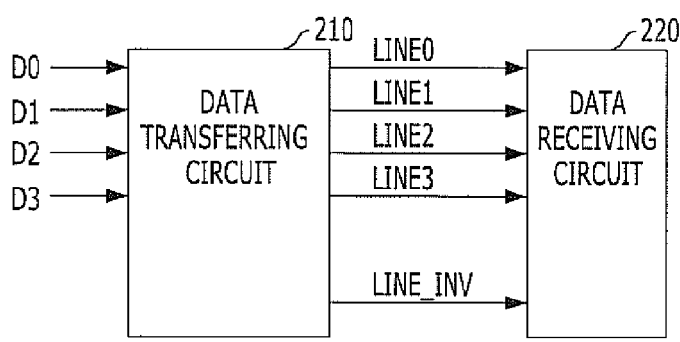
FIG. 1 illustrates a case where cross talk noise and inductive noise occur in a plurality of parallel data transfer lines LINE0 to LINE3 through which data are transferred.
FIG. 2 is a block view illustrating a data transferring/receiving system in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 2 is a block view illustrating a data transferring/receiving system in accordance with an embodiment of the present invention.

Referring to FIG. 2, the data transferring/receiving system includes a data transferring circuit 210 and a data receiving circuit 220.

The data transferring circuit 210 transfers data D0 to D3 through data transfer lines LINE0 to LINE3. When the data to be loaded on the data transfer lines LINE0 to LINE3 have a two-aggressor-one-victim pattern (that is, the data of the adjacent two lines has an opposite logic value to the data of the middle line) or have the same value (that is, so as to cause inductive noise when switching together), the data transferring circuit 210 inverts some data among the data D0 to D3 being transferred and transfers the inverted data to the data transfer lines LINE0 to LINE3. Also, the data transferring circuit 210 transfers an inversion signal INV for informing that some data are inverted through an inversion information transfer line LINE_INV.

When the data D0 to D3 to be loaded on the data transfer lines LINE0 to LINE3 have a two-aggressor-one-victim pattern (that is, the data of the adjacent two lines has an opposite logic value to the data of the middle line) or have the same value (that is, so as to cause inductive noise when switching together), the data transferring circuit 210 transfer the data D0 to D3 through the data transfer lines LINE0 to LINE3 after inverting some data. Therefore, the two-aggressor-one-victim pattern and the pattern where all data on the data transfer lines LINE0 to LINE3 are the same are prevented from occurring in the data transfer lines LINE0 to LINE3.

The data receiving circuit 220 receives data transferred through the data transfer lines LINE0 to LINE3 and receives the inversion signal INV transferred through the inversion information transfer line LINE_INV. The data receiving circuit 220 inverts the received data from the data transferring circuit 210 in response to the inversion signal INV so as to restore the same data as the data D0 to D3 inputted to the data transferring circuit 210.

The data transferring circuit 210 and the data receiving circuit 220 may be provided within the same integrated circuit chip or they may be provided within different integrated circuit chips. Here, the exemplary embodiment of the present invention may be applied to the data transfer/reception in one chip or to the data transfer/reception between chips.

Figure 3:
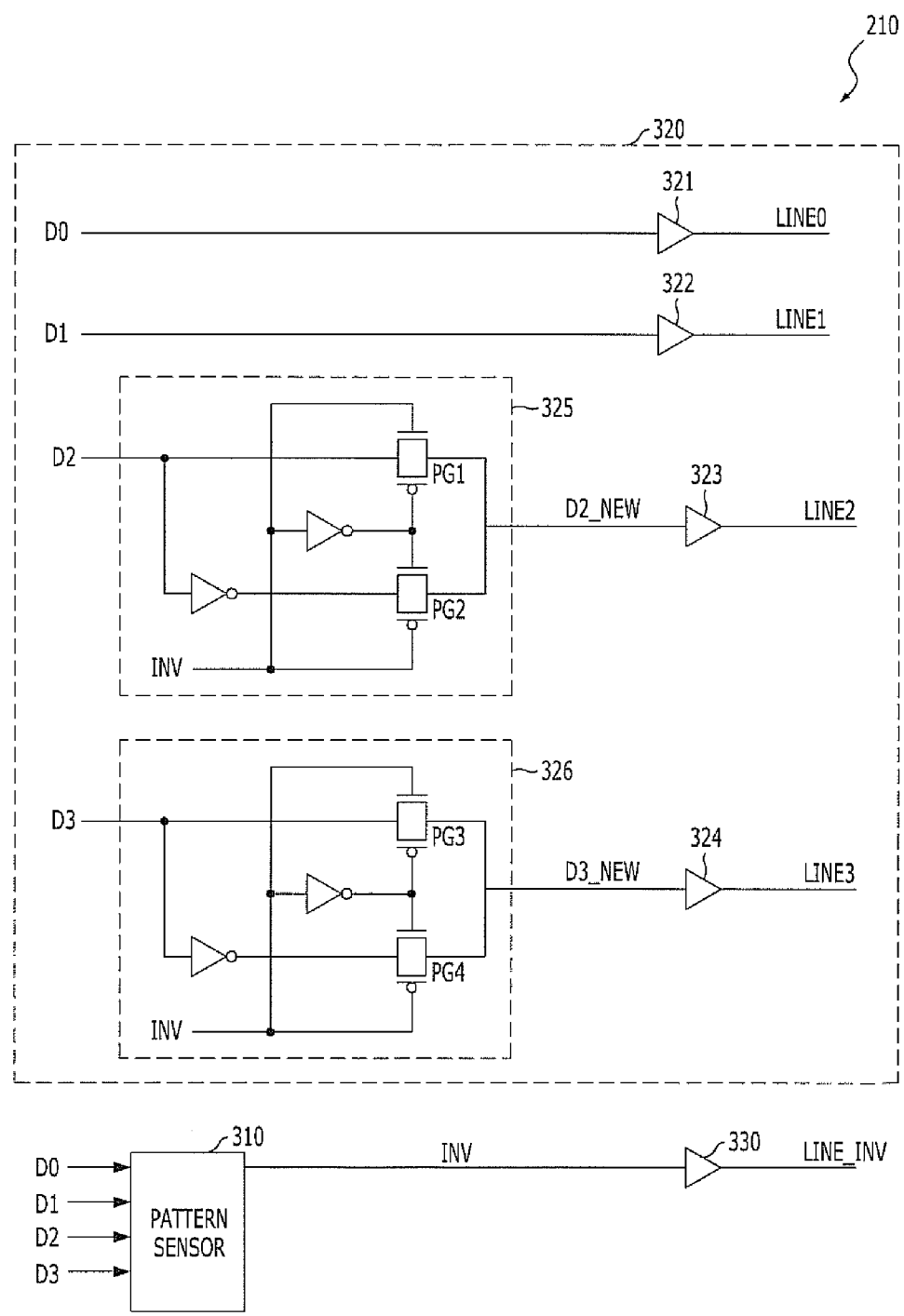
FIG. 3 is a schematic diagram of a data transferring circuit 210 shown in FIG. 2.

FIG. 3 is a schematic diagram of the data transferring circuit 210 shown in FIG. 2.

Referring to FIG. 3, the data transferring circuit 210 includes a pattern sensor 310, a data transferor 320, and an inversion information transferor 330. The pattern sensor 310 enables the inversion signal INV when nibble data D0 to D3 have a two-aggressor-one-victim pattern or have the same value. Herein, a nibble data D0 to D3 is a 4-bit data. The data transferor 320 transfers nibble data D0 to D3 to a plurality of data transfer lines LINE0 to LINE3. When the data transferor 320 transfers the nibble data D0 to D3 to the data transfer lines LINE0 to LINE3, it inverts some data, for example, data D2 and D3 herein, of the nibble data D0 to D3 in response to the inversion signal INV. The inversion information transferor 330 transfers the inversion signal INV through the inversion information transfer line LINE_INV.

The pattern sensor 310 receives the nibble data D0 to D3, and when the nibble data D0 to D3 have a two-aggressor-one-victim pattern or have the same value, the pattern sensor 310 enables the inversion signal INV to a logic low level '0'. The pattern sensor 310 will be described later in detail with reference to FIG. 4.

The data transferor 320 includes drivers 321 to 324 and inverters 325 and 326. The drivers 321 to 324 drive data D0 and D1 to data transfer lines LINE0 and LINE1. The inverters 325 and 326 invert data D2 and D3 and output inverted data as D2_NEW and D3_NEW when the inversion signal INV is enabled to a logic level of '0', and output the data without inverting as D2_NEW and D3_NEW when the inversion signal INV is disabled to a logic level of '1'.

The inverters 325 and 326 include path gates PG0, PG1, PG2 and PG3 and an inversion unit. As to the operation of the inverters 325 and 326, when the inversion signal INV has a logic level of '1', the path gates PG0 and PG2 are turned on to output the data D2 and D3 as is, and when the inversion signal INV has a logic level of '0', the path gates PG1 and PG3 are turned on to invert the data D2 and D3 in the inversion unit and output the inverted data.

The inversion information transferor 330 includes a driving unit for driving the inversion signal INV generated in the pattern sensor 310 to the inversion information transfer line LINE_INV.

FIG. 3 illustrates the upper two bit data D2 and D3 among the nibble data D0 to D3 are inverted when the data transferor 320 enables the inversion signal INV. However, the same result may be obtained when the lower two bit data D0 and D1 among data D0 to D3 are inverted and transferred when the data transferor 320 enables the inversion signal INV.

Figure 4:
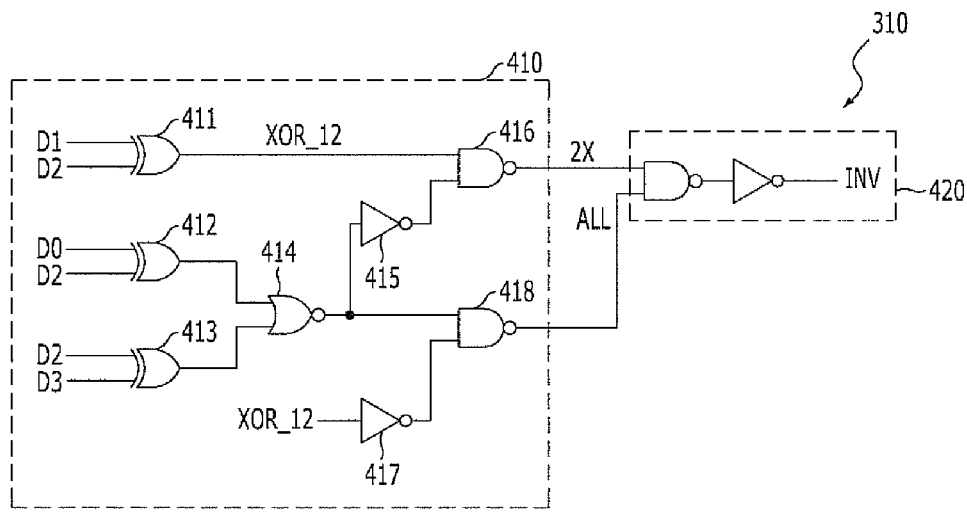
FIG. 4 is a schematic diagram of a pattern sensor 310 shown in FIG. 3.

FIG. 4 is a schematic diagram of the pattern sensor 310 shown in FIG. 3.

Referring to FIG. 4, the pattern sensor 310 includes a sensing unit 410 and an inversion signal generation unit 420.

The sensing unit 410 generates a cross talk signal 2X that is enabled when the nibble data D0 to D3 have a two-aggressor-one-victim pattern, and an identical signal ALL that is enabled when the nibble data D0 to D3 have the same logic value. As illustrated in the drawing, the sensing unit 410 may include XOR gates 411, 412 and 413, a NOR gate 414, inversion elements 415 and 417, and NAND gates 416 and 418.

The inversion signal generation unit 420 enables the inversion signal INV to a logic level of '0' when one or more signals of the cross talk signal 2X and the identical signal ALL are enabled to a logic level of '0'.

The following Table 1 presents the operation of the pattern sensor 310. The operation of the pattern sensor 310 may be seen from Table 1.

TABLE 1

| D0 | D1 | D2 | D3 | 2X | ALL | INV |
|----|----|----|----|----|-----|-----|
| 0  | 0  | 0  | 0  | 1  | 0   | 0   |
| 0  | 0  | 0  | 1  | 1  | 1   | 1   |
| 0  | 0  | 1  | 0  | 0  | 1   | 0   |
| 0  | 0  | 1  | 1  | 1  | 1   | 1   |
| 0  | 1  | 0  | 0  | 0  | 1   | 0   |
| 0  | 1  | 0  | 1  | 0  | 1   | 0   |
| 0  | 1  | 1  | 0  | 1  | 1   | 1   |
| 0  | 1  | 1  | 1  | 1  | 1   | 1   |
| 1  | 0  | 0  | 0  | 1  | 1   | 1   |
| 1  | 0  | 0  | 1  | 1  | 1   | 1   |
| 1  | 0  | 1  | 0  | 0  | 1   | 0   |
| 1  | 0  | 1  | 1  | 0  | 1   | 0   |
| 1  | 1  | 0  | 0  | 1  | 1   | 1   |
| 1  | 1  | 0  | 1  | 0  | 1   | 0   |
| 1  | 1  | 1  | 0  | 1  | 1   | 1   |
| 1  | 1  | 1  | 1  | 1  | 0   | 0   |

Figure 5:
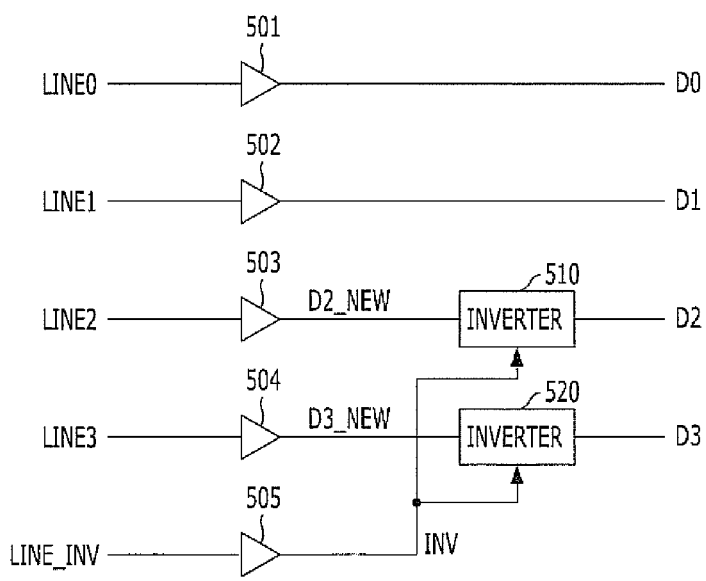
FIG. 5 is a schematic diagram of a data receiving circuit 210 shown in FIG. 2.

FIG. 5 is a schematic diagram of a data receiving circuit 210 shown in FIG. 2.

Referring to FIG. 5, the data receiving circuit 220 includes buffers 501 to 504 for receiving data from the data transfer lines LINE0 to LINE3, a buffer 505 for receiving the inversion signal INV from the inversion information transfer line LINE_INV, and inverters 510 and 520.

The inverter 510 inverts data D2_NEW and D3_NEW that are received through the buffers 503 and 504 in response to the inversion signal INV. When the inversion signal INV is enabled, the inverter 510 inverts the data D2_NEW and D3_NEW and outputs inverted data. When the inversion signal INV is disabled, the inverter 510 outputs the data D2_NEW and D3_NEW as is. After all, the inverters 510 and 520 of the data receiving circuit 220 invert the inverted data obtained from the inversion of the inverters 325 and 326 of the data transferring circuit 210 once again. Since the inverters 510 and 520 are formed the same as the inverters 325 and 326 shown in FIG. 3, further description thereof is omitted.

Figure 6:
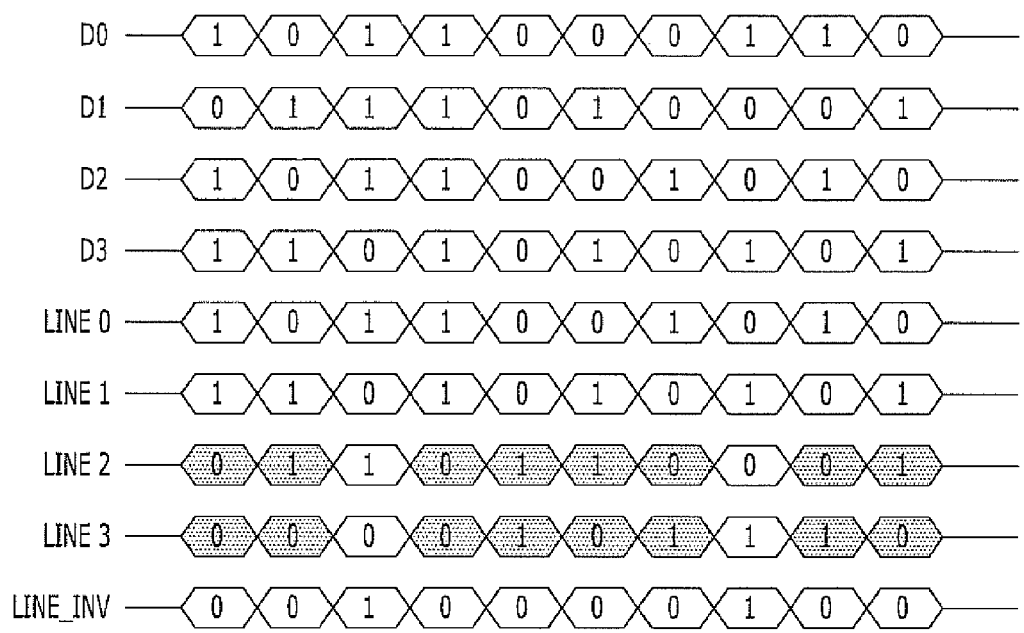
FIG. 6 illustrates data D0 to D3 inputted to the data transferring circuit 210 and data on the data transfer lines LINE0 to LINE3.

FIG. 6 illustrates data D0 to D3 inputted to the data transferring circuit 210 and data on the data transfer lines LINE0 to LINE3.

Referring to FIG. 6, when the inversion signal INV on the inversion information transfer line LINE_INV is enabled to a logic level of '0', the data D2 and D3 among the nibble data D0 to D3 are inverted and loaded on the data transfer lines LINE0 to LINE3. Here, the two-aggressor-one-victim pattern or the pattern where all data have the same logic values exist in the nibble data D0 to D3 inputted to the data transferring circuit 210. The shaded data shown in the data transfer lines LINE0 to LINE3 of FIG. 5 are inverted data.

Hereafter, the terms even data and odd data are used in relation to one another. Among the data transferred consecutively, a data synchronized with a 'high' duration of a clock is an even data, a data synchronized with a 'low' duration of a clock is an odd data. Conversely, among the data transferred consecutively, when a data synchronized with a 'high' duration of a clock is an odd data, the data synchronized with a 'low' duration of a clock is an even data. Also, among the data transferred consecutively, when a data that comes in an even position is an even data, a data that comes in an odd position is an odd data. Conversely, among the data transferred consecutively, if a data that comes in an odd position is an even data, a data that comes in an even position is an odd data.

In the embodiment of the present invention described below, it is assumed that a data synchronized with a 'high' duration of a clock is an even data and a data synchronized with a 'low' duration of a clock is an odd data, for illustration purposes.

Figure 7:
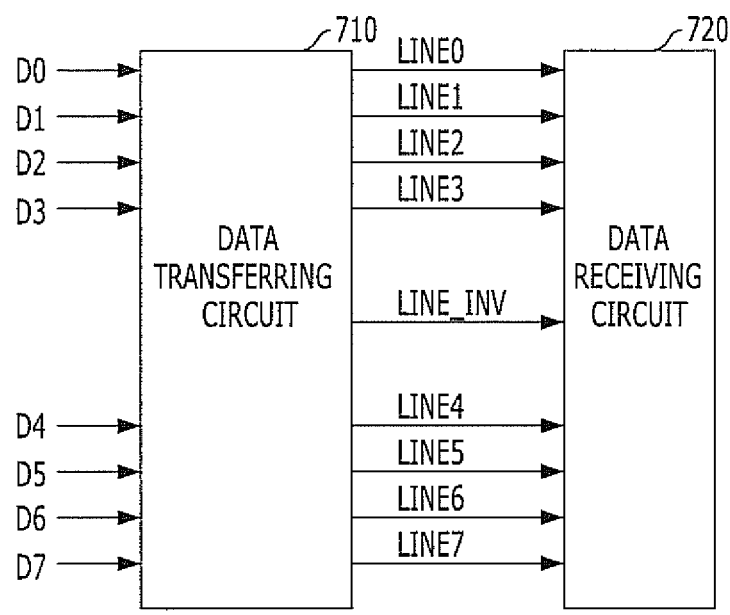
FIG. 7 is a block view illustrating a data transferring/receiving system in accordance with another embodiment of the present invention.

FIG. 7 is a block view illustrating a data transferring/receiving system in accordance with another embodiment of the present invention.

Referring to FIG. 7, the data transferring/receiving system includes a data transferring circuit 710 and a data receiving circuit 720.

The data transferring circuit 710 transfers low nibble data D0 to D3 through first data transfer lines LINE0 to LINE3 and transfers high nibble data D4 to D7 through second data transfer lines LINE4 to LINE7. When the data D0 to D3 and D4 to D7 have a two-aggressor-one-victim pattern or have the same value throughout, the data transferring circuit 710 transfers data D0 to D3 and D4 to D7 after inverting some data in order to remove the two-aggressor-one-victim pattern or the pattern where all data inside the nibble D0 to D3 and D4 to D7 have the same value. Also, the data transferring circuit 710 transfers the information on the inverted data inverted by the data transferring circuit 710 to the inversion information transfer line LINE_INV. The data transferring circuit 710 will be described later in detail.

The data receiving circuit 720 receives the high nibble data and the low nibble data that are transferred through the first data transfer lines LINE0 to LINE3 and the second data transfer lines LINE4 to LINE7 and receives the inversion signal INV transferred through the inversion information transfer line LINE_INV. The data receiving circuit 720 inverts the inverted data received from the data transferring circuit 710 again in response to the inversion signal INV so as to restore the same data as the data D0 to D7 that are inputted to the data transferring circuit 710.

According to the embodiment of the present invention, the two-aggressor-one-victim pattern and the pattern where all the data have the same value are removed from the first data transfer lines LINE0 to LINE3, and the two-aggressor-one-victim pattern and the pattern where all the data have the same value are removed from the second data transfer lines LINE4 to LINE7. Therefore, although the first data transfer lines LINE0 to LINE3 are disposed close to each other, the high-speed transfer of the data may be performed appropriately, and although the second data transfer lines LINE4 to LINE7 are disposed close to each other, the high-speed transfer of the data may be performed appropriately. However, the first data transfer lines LINE0 to LINE3 and the second data transfer lines LINE4 to LINE7 may be disposed far from each other.

The data transferring circuit 710 and the data receiving circuit 720 may be provided within the same integrated circuit chip or they may be provided within different integrated circuit chips.

Figure 8:
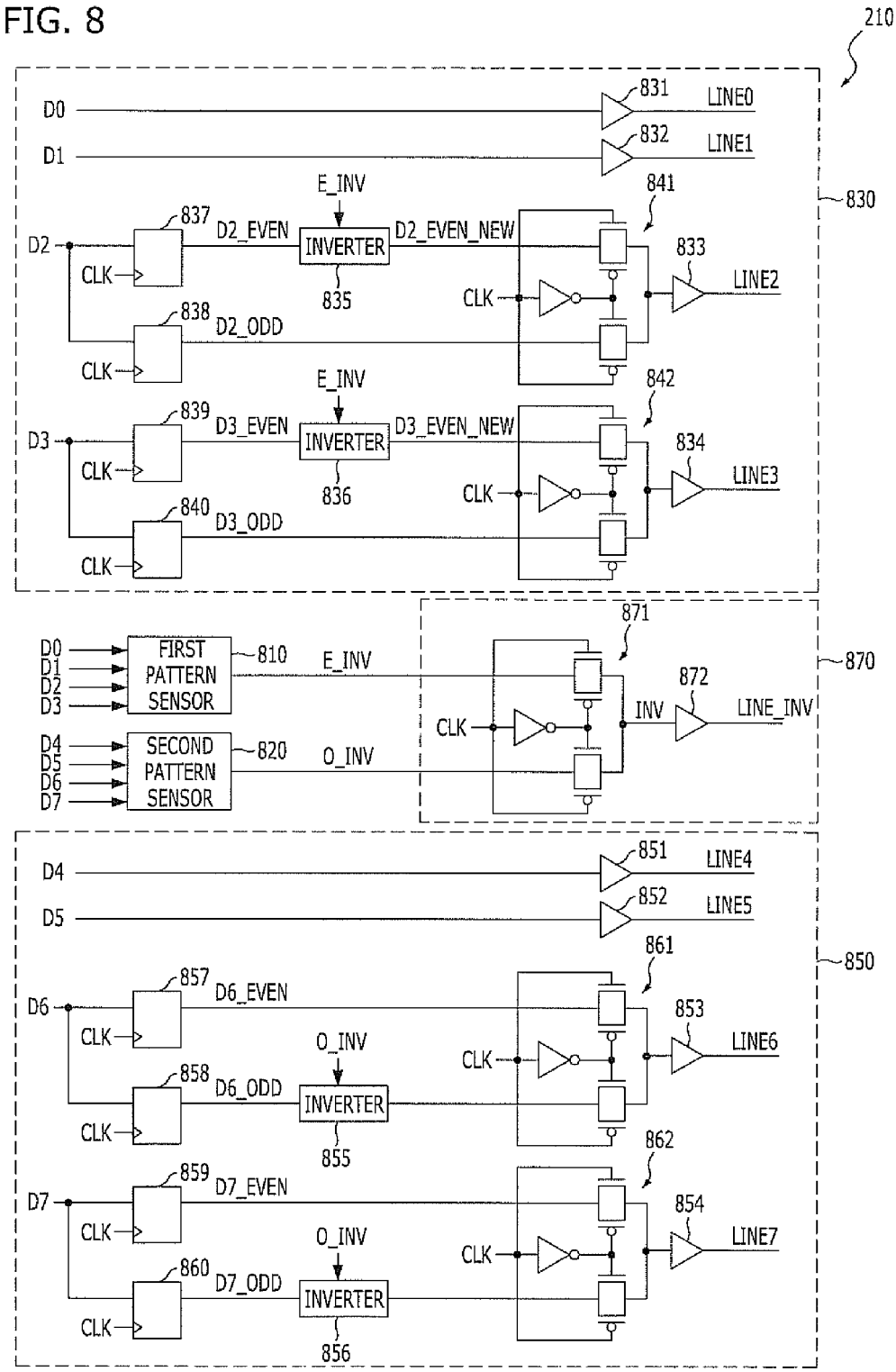
FIG. 8 is a schematic diagram of a data transferring circuit 710 shown in FIG. 7.

FIG. 8 is a schematic diagram of the data transferring circuit 710 shown in FIG. 7.

Referring to FIG. 8, the data transferring circuit 710 includes a first pattern sensor 810, a second pattern sensor 820, a first data transferor 830, a second data transferor 850, and an inversion information transferor 870. The first pattern sensor 810 enables an even inversion signal E_INV when even data D0_EVEN to D3_EVEN of the low nibble data D0 to D3 have a two-aggressor-one-victim pattern or have the same value. The second pattern sensor 820 enables an odd inversion signal O_INV when odd data D4_ODD to D7_ODD of the high nibble data D4 to D7 have a two-aggressor-one-victim pattern or have the same value. The first data transferor 830 transfers the low nibble data D0 to D3 through a plurality of first data transfer lines LINE0 to LINE3. When the first data transferor 830 transfers the low nibble data D0 to D3 through the first data transfer lines LINE0 to LINE3, it inverts some data, for example, data D0_EVEN and D3_EVEN herein, of the even data D0_EVEN to D3_EVEN of the low nibble data D0 to D3 in response to the even inversion signal E_INV. The second data transferor 850 transfers the high nibble data D4 to D7 through a plurality of second data transfer lines LINE4 to LINE7. When the second data transferor 850 transfers the high nibble data D4 to D7 through the second data transfer lines LINE4 to LINE7, it inverts some data, for example, data D6_ODD and D7_ODD herein, of the odd data D4_ODD to D7_ODD of the high nibble data D4 to D7 in response to the odd inversion signal O_INV. The inversion information transferor 870 transfers the even inversion signal E_INV and the odd inversion signal O_INV through the inversion information transfer line LINE_INV.

The first pattern sensor 810 enables the even inversion signal E_INV to a logic level of '0', when the even data D0_EVEN to D3_EVEN of the low nibble data D0 to D3 have a two-aggressor-one-victim pattern or have the same value (that is, throughout). The first pattern sensor 810 receives the low nibble data D0 to D3 and extracts the even data D0_EVEN to D3_EVEN from the low nibble data D0 to D3. The first pattern sensor 810 will be described later in detail with reference to the accompanying drawing.

The second pattern sensor 820 enables the odd inversion signal O_INV to a logic level of '0', when the odd data D4_ODD to D7_ODD of the high nibble data D4 to D7 have a two-aggressor-one-victim pattern or have the same value. The second pattern sensor 820 receives the high nibble data D4 to D7 and extracts the odd data D4_ODD to D7_ODD of the high nibble data D4 to D7. The second pattern sensor 820 will be described later in detail with reference to the accompanying drawing.

The first data transferor 830 includes drivers 831 to 834, inverters 835 and 836, even input units 837 and 839, odd input units 838 and 840, and selectors 841 and 842. The drivers 831 and 832 drive data D0 and D1 to first data transfer lines LINE0 and LINE1. Therefore, the data D0 and D1 among the low nibble data D0 to D3 are transferred to the first data transfer lines LINE0 and LINE1 as is. The even input units 837 and 839 receive data D2 and D3 in synchronization with a high duration of a clock CLK and output even data D2_EVEN and D3_EVEN. The odd input units 838 and 840 receive data D2 and D3 in synchronization with a low duration of a clock CLK and output odd data D2_ODD and D3_ODD. The inverters 835 and 836 invert the even data D2_EVEN and D3_EVEN and output inverted data when the even inversion signal E_INV is enabled to a logic level of '0', and when the even inversion signal E_INV is enabled to a logic level of '1', the inverters 835 and 836 output the even data D2_EVEN and D3_EVEN as is. The selectors 841 and 842 select the output D2_EVEN_NEW and D3_EVEN_NEW of the inverters 835 and 836 and output the selected ones while the clock CLK is in a logic high level. The selectors 841 and 842 select the odd data D2_ODD and D3_ODD and output the selected ones while the clock CLK is in a logic low level. The drivers 833 and 834 drive the output value of the selectors 841 and 842 to the first data transfer lines LINE2 and LINE3.

The second data transferor 850 includes drivers 851 to 854, inverters 855 and 856, even input units 857 and 859, odd input units 858 and 860, and selectors 861 and 862. The drivers 851 and 852 drive data D4 and D5 to second data transfer lines LINE4 and LINE5. Therefore, the data D4 and D5 among the high nibble data D4 to D7 are transferred to the second data transfer lines LINE4 and LINE5 as is. The even input units 857 and 859 receive data D6 and D7 in synchronization with a high duration of a clock CLK and output even data D6_EVEN and D7_EVEN. The odd input units 858 and 860 receive data D6 and D7 in synchronization with a low duration of a clock CLK and output odd data D6_ODD and D7_ODD. The inverters 855 and 856 invert the odd data D6_ODD and D7_ODD and output inverted data when the odd inversion signal O_INV is enabled to a logic level of '0', and when the odd inversion signal O_INV is enabled to a logic level of '1', the inverters 855 and 856 output the odd data D6_ODD and D7_ODD as is. The selectors 861 and 862 select even data D6_EVEN and D7_EVEN while the clock CLK is in a logic high level and outputs the selected data. The selectors 861 and 862 select the output D6_ODD_NEW and D7_ODD_NEW of the inverters 855 and 856 while the clock CLK is in a logic low level and outputs the selected data. The drivers 851 to 854 drive the output value of the selectors 861 and 862 to the second data transfer lines LINE6 and LINE7.

The inversion information transferor 870 includes a selection unit 871 and a driving unit 872. The selection unit 871 selects and outputs the even inversion signal E_INV in a duration where a clock CLK is in a logic high level, and selects and outputs the odd inversion signal O_INV in a duration where a clock CLK is in a logic low level. The driving unit 872 drives an output signal of the selection unit 871 to the inversion information transfer line LINE_INV.

The data transferring circuit 710 illustrated in FIG. 8 inverts the even data D2_EVEN to D3_EVEN of the low nibble data D0 to D3 based on a data pattern and inverts the odd data D6_ODD to D7_ODD of the high nibble data D4 to D7 based on a data pattern. As shown above, a pattern where great noise occurs in the first data transfer lines LINE0 to LINE3 and the second data transfer lines LINE4 to LINE7 may be prevented. The two-aggressor-one-victim pattern as described above occurs when the data of adjacent two lines transitions in the opposite direction to the data of the line between the two lines. The pattern where all data have the same value may cause noise when the data of all lines simultaneously transitions to the same value.

FIG. 8 illustrates the upper two bit even data D2_EVEN and D3_EVEN among the low nibble data D0 to D3 are inverted when the first data transferor 830 enables the even inversion signal E_INV, and the upper two bit odd data D6_ODD and D7_EVEN among the high nibble data D4 to D7 are inverted when the second data transferor 850 enables the odd inversion signal O_INV. However, the same result may be obtained when the first data transferor 830 inverts the lower two bit even data D0_EVEN and D1_EVEN among the low nibble data D0 to D3 and the second data transferor 850 inverts the lower two bit odd data D4_ODD and D5_EVEN among the high nibble data D4 to D7.

Figure 9:
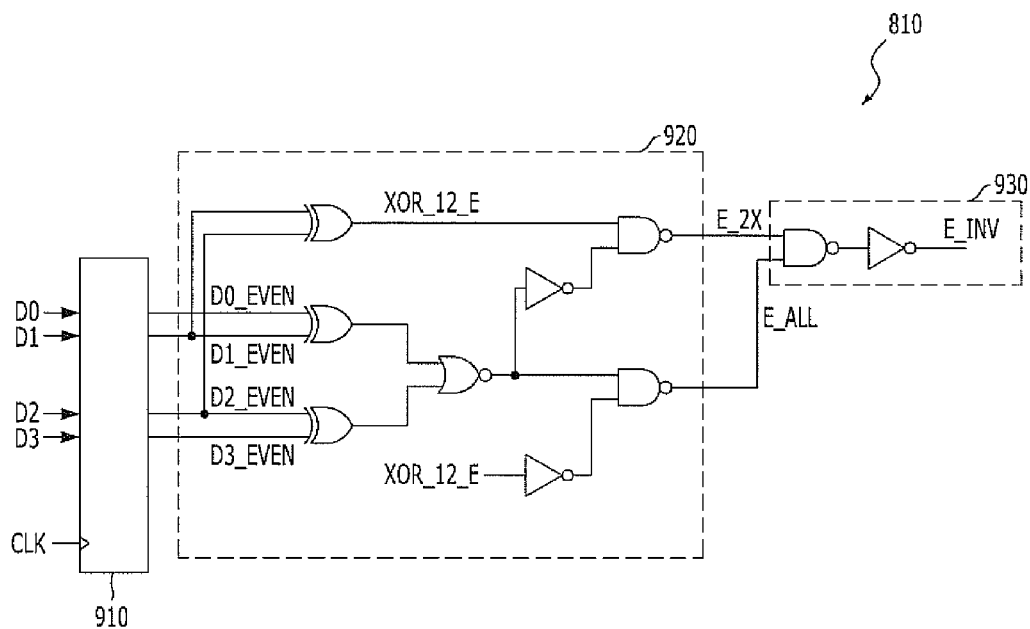
FIG. 9 is a schematic diagram of a first pattern sensor 810 shown in FIG. 8.

FIG. 9 is a schematic diagram of the first pattern sensor 810 shown in FIG. 8.

Referring to FIG. 9, the first pattern sensor 810 includes an even input unit 910, an even sensing unit 920, and an even inversion signal generation unit 930.

The even input unit 910 receives the low nibble data D0 to D3 in synchronization with a high duration of a clock CLK. Therefore, even data D0_EVEN to D3_EVEN of the low nibble data D0 to D3 are outputted from the even input unit 910.

The even sensing unit 920 enables an even cross talk signal E_2X when the even data D0_EVEN to D3_EVEN of the lownibble data D0 to D3 have a two-aggressor-one-victim pattern and enables an even identical signal E_ALL when the even data D0_EVEN to D3_EVEN of the low nibble data D0 to D3 have the same logic value. The even sensing unit 920 operates the same as the sensing unit 410 shown in FIG. 4, and there is a difference only in the received data. Therefore, further description as to the even sensing unit 920 will be omitted.

The even inversion signal generation unit 930 enables the even inversion signal E_INV to a logic level of '0' when one or more signals of an even cross talk signal E_2X and the even identical signal E_ALL are enabled to a logic level of '0'.

Figure 10:
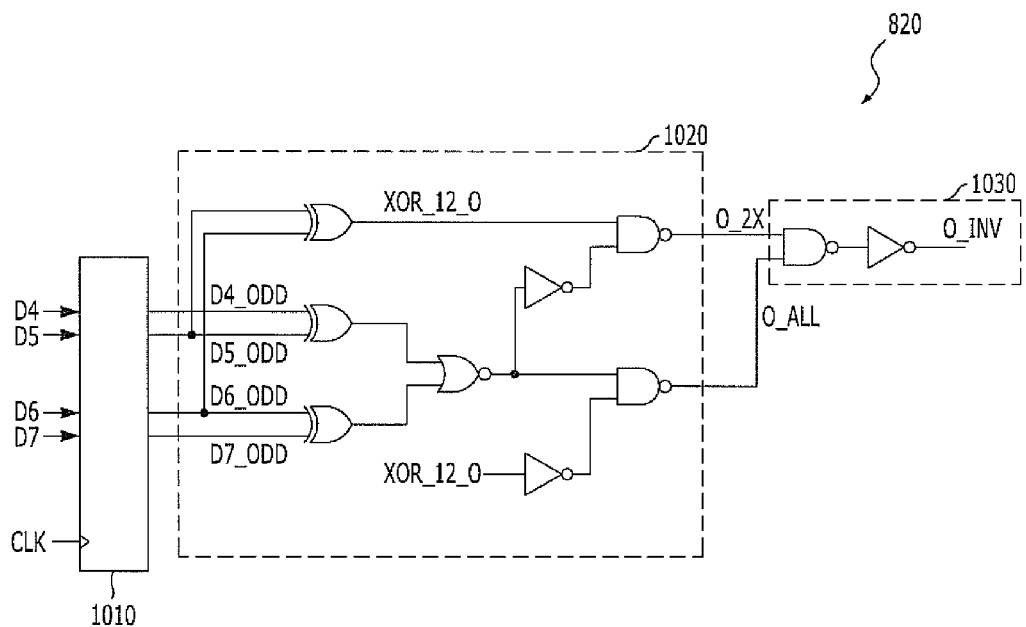
FIG. 10 is a schematic diagram of a second pattern sensor 820 shown in FIG. 8.

FIG. 10 is a schematic diagram of the second pattern sensor 820 shown in FIG. 8.

Referring to FIG. 10, the second pattern sensor 820 includes an odd input unit 1010, an odd sensing unit 1020, and an odd inversion signal generation unit 1030.

The odd input unit 1010 receives the high nibble data D4 to D7 in synchronization with a low duration of a clock CLK. Therefore, odd data D4_ODD to D7_ODD of the high nibble data D4 to D7 are outputted from the odd input unit 1010.

The odd sensing unit 1020 enables an odd cross talk signal O_2X when the odd data D4_ODD to D7_ODD of the high nibble data D4 to D7 have a two-aggressor-one-victim pattern and enables an odd identical signal O_ALL when the odd data D4_ODD to D7_ODD of the high nibble data D4 to D7 have the same logic value. The odd sensing unit 1020 operates the same as the sensing unit 410 shown in FIG. 4, and there is a difference, for example, only in the received data. Therefore, further description on the odd sensing unit 1020 will be omitted herein.

The odd inversion signal generation unit 1030 enables the odd inversion signal O_INV to a logic level of '0' when one or more signals of an odd cross talk signal O_2X and the odd identical signal O_ALL are enabled to a logic level of '0'.

Figure 11:
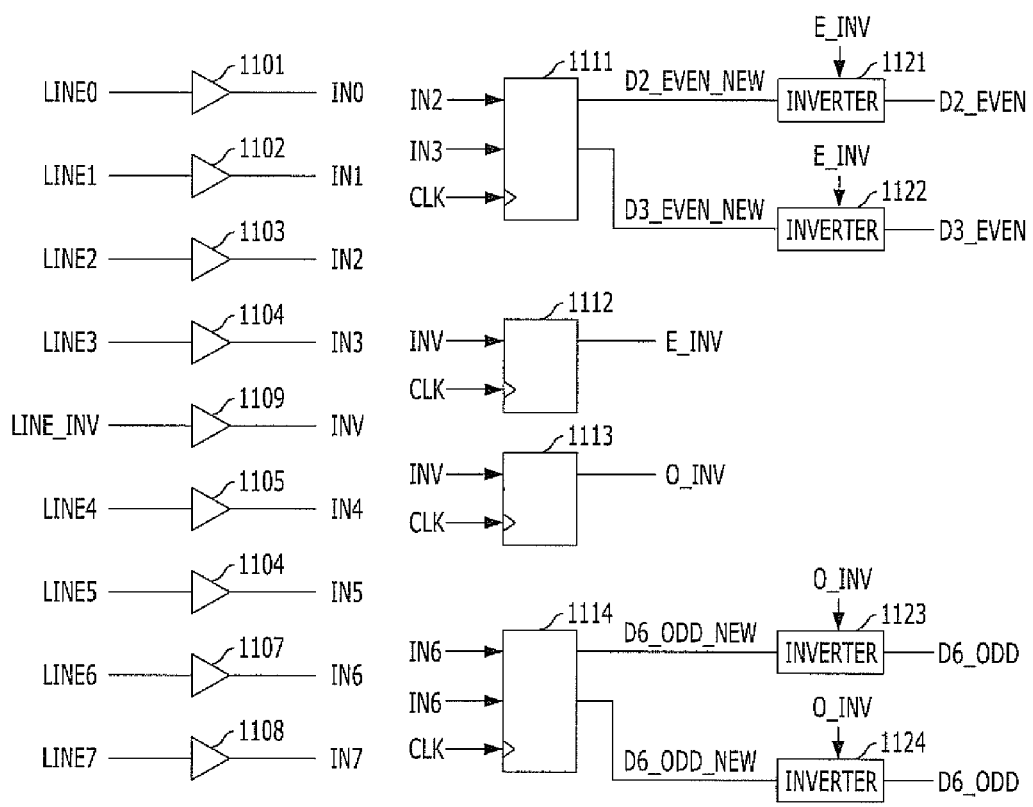
FIG. 11 is a schematic diagram of a data receiving circuit 720 shown in FIG. 7.

FIG. 11 is a schematic diagram of a data receiving circuit 720 shown in FIG. 7.

Referring to FIG. 11, the data receiving circuit 720 includes buffers 1101 to 1109 for receiving data from the first data transfer lines LINE0 to LINE3, the second data transfer lines LINE4 to LINE7, and the inversion information transfer line LINE_INV, input units 1111 to 1114, and inverters 1121 to 1124.

The input unit 1112 receives an output signal INV of the buffer 1109 during a high duration of a clock CLK. Therefore, an output signal of the input unit 1112 becomes an even inversion signal E_INV. Also, the input unit 1113 receives an output signal INV of the buffer 1109 during a low duration of a clock CLK. Therefore, an output signal of the input unit 1113 becomes an odd inversion signal O_INV.

The input unit 1111 receives the output signals IN3 and IN4 of the buffers 1103 and 1104 during a high duration of a clock CLK. Also, the inverters 1121 and 1122 invert and output the output signals D2_EVEN_NEW and D3_EVEN_NEW of the input unit 1111 when the even inversion signal E_INV is enabled. When the even inversion signal E_INV is disabled, the inverters 1121 and 1122 output the output signals of the input unit 1111 as is. Therefore, the output signals of the inverters 1121 and 1122 are even data D2_EVEN and D3_EVEN.

The input unit 1114 receives the output signals IN6 and IN7 of the buffers 1107 and 1108 during a low duration of a clock CLK. Also, the inverters 1123 and 1124 invert and output the output signals D6_ODD_NEW and D7_ODD_NEW of the input unit 1114 when the odd inversion signal O_INV is enabled. When the odd inversion signal O_INV is disabled, the inverters 1123 and 1124 output the output signals of the input unit 1114 as is. Therefore, the output signals of the inverters 1123 and 1124 become odd data D6_ODD and D7_ODD.

After all, the data receiving circuit 720 restores all the data D0 to D7 that are inputted to the data transferring circuit 710.

Figure 12:
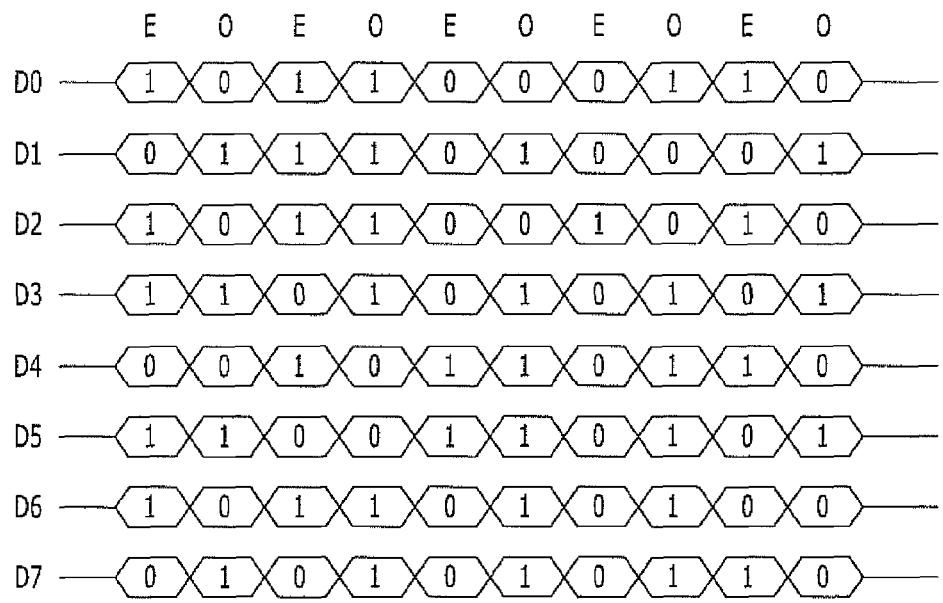
FIG. 12 illustrates low nibble data D0 to D3 and high data D4 to D7 inputted to the data transferring circuit 710 and data on first data transfer lines LINE0 to LINE3 and second data transfer lines LINE4 to LINE7.
Figure 12:
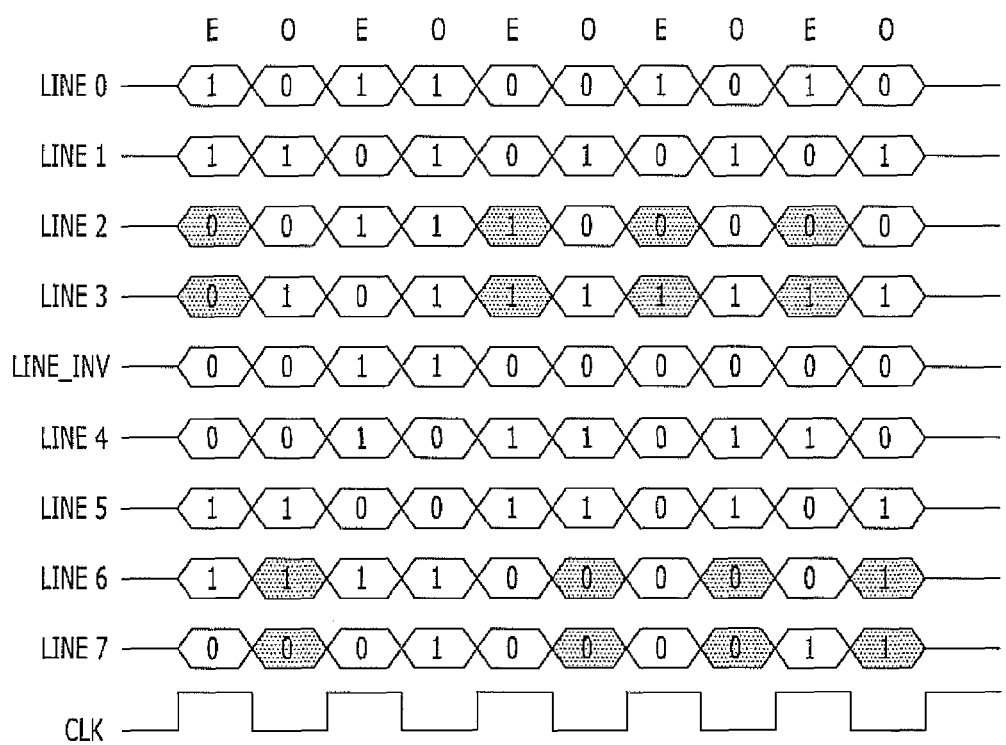

FIG. 12 illustrates low nibble data D0 to D3 and high nibble data D4 to D7 inputted to the data transferring circuit 710 and data on first data transfer lines LINE0 to LINE3 and second data transfer lines LINE4 to LINE7.

Referring to FIG. 12, consecutive two-aggressor-one-victim pattern and consecutive pattern where nibble data have the same logic value do not occur in the first data transfer lines LINE0 to LINE3 and the second data transfer lines LINE4 to LINE7.

In FIG. 12, the shaded data denote inverted data produced by the data transferring circuit 710.

According to an embodiment of the present invention, a pattern causing cross talk and a pattern where all data have the same value are removed from a data transfer line through which data are transferred. Therefore, cross talk noise and SSO noise are reduced in the data transfer line, and as a result, data may be appropriately transferred at a high data transfer rate.

While the present invention has been described with respect to the specific embodiments, it will be apparent to those skilled in the art that various changes and modifications may be made without departing from the spirit and scope of the invention as defined in the following claims.

What is claimed is:

1. A data transferring circuit, comprising:
a data transferor configured to transfer data through a plurality of parallel data transfer lines, wherein the data transferor is further configured to partially invert the transferred data in response to an inversion signal, wherein the inverted transferred data includes data to be transferred through first two of the parallel data transfer lines in sequence or data to be transferred through last two of the parallel data transfer lines in sequence; and
a pattern sensor configured to enable the inversion signal when data transferred through the parallel data transfer lines is to cause three sequential lines to transfer data of a logic value through a middle one of the sequential lines and data of an inverse of the logic value through the remaining ones of the sequential lines or cause all of the transfer lines to transfer data of a same logic value.

2. The data transferring circuit of claim 1, further comprising:
an inversion information transferor configured to transfer the inversion signal through an inversion information transfer line.

3. A data transferring/receiving system, comprising:
a data transferring circuit including
a data transferor configured to transfer data through a plurality of parallel data transfer lines, wherein the data transferor is further configured to partially invert the transferred data in response to an inversion signal, wherein the inverted transferred data includes data to be transferred through first two of the parallel data transfer lines in sequence or data to be transferred through last two of the parallel data transfer lines in sequence, a pattern sensor configured to enable the inversion signal when data transferred through the parallel data transfer lines is to cause three sequential lines to transfer data of a logic value through a middle one of the sequential lines and data of an inverse of the logic value through the remaining ones of the sequential lines or cause all of the transfer lines to transfer data of a same logic value, and an inversion information transferor configured to transfer the inversion signal through an inversion information transfer line; and a data receiving circuit configured to invert the inverted data received from the data transferor in response to the inversion signal.

4. The data transferring/receiving system of claim 3, wherein the data transferring circuit and the data receiving circuit are disposed within one integrated circuit chip.

5. The data transferring/receiving system of claim 3, wherein the data transferring circuit and the data receiving circuit are disposed in different integrated circuit chips.

6. A data transfer system comprising:

a first pattern sensor configured to enable an even inversion signal when even data of low nibble data have a two-aggressor-one-victim pattern or have the same value;

a second pattern sensor configured to enable an odd inversion signal when odd data of high nibble data have a two-aggressor-one-victim pattern or have the same value;

a first data transferor configured to transfer the low nibble data through a plurality of first data transfer lines, where a portion of the even data of the low nibble data is inverted or not inverted in response to the even inversion signal before being transferred;

a second data transferor configured to transfer the high nibble data through a plurality of second data transfer lines, where a portion of the odd data of high nibble data is inverted or not inverted in response to the odd inversion signal before being transferred;

an inversion information transferor configured to alternately transfer the even inversion signal and the odd inversion signal through an inversion information transfer line; and data receiving circuit including a first receiver configured to invert inverted data obtained from an inversion by the first data transferor among the data received through the first data transfer lines in response to the even inversion signal, and a second receiver configured to invert inverted data obtained from an inversion by the second data transferor among the data received through the second data transfer lines in response to the odd inversion signal.

7. The data transfer system of claim 6, wherein the portion of the even data of the low nibble data includes upper two-bit data or lower two-bit data of the even data of the low nibble data.

8. The data transfer system of claim 7, wherein the portion of the odd data of the high nibble data includes upper two-bit data or lower two-bit data of the odd data of the high nibble data.

9. The data transfer system of claim 6, wherein the even data and the odd data are data synchronized with different logic levels of a clock.

10. The data transfer system of claim 6, wherein the first pattern sensor comprises:

an even input unit for receiving the low nibble data in synchronization with a clock and extracting even data out of the low nibble data;

an even sensing unit for generating an even cross talk signal that is enabled when the even data of the low nibble data have a two-aggressor-one-victim pattern and an even identical signal that is enabled when the even data of the low nibble data have the same value; and an even inversion signal generation unit for enabling the even inversion signal when more than one signal of the even cross talk signal and the even identical signal is enabled.

11. The data transfer system of claim 10, wherein the even sensing unit comprises a plurality of XOR gates that receive a portion of the even data of the low nibble data.

12. The data transfer system of claim 6, wherein the second pattern sensor comprises:

an odd input unit for receiving the high nibble data in synchronization with a clock and extracting odd data out of the high nibble data;

an odd sensing unit for generating an odd cross talk signal that is enabled when the odd data of the high nibble data have a two-aggressor-one-victim pattern and an odd identical signal that is enabled when the odd data of the high nibble data have the same value; and an odd inversion signal generation unit for enabling the odd inversion signal when more than one signal of the odd cross talk signal and the odd identical signal is enabled.

13. The data transfer system of claim 12, wherein the odd sensing unit comprises a plurality of XOR gates that receive a portion of the odd data of the high nibble data.

14. The data transfer system of claim 6, wherein the first data transfer lines are disposed with a relatively short distance there between, and the second data transfer lines are disposed with a relatively short distance there between, and the first data transfer lines and the second data transfer lines are disposed with a relatively far distance between the first data transfer lines and the second data transfer lines.

15. The data transfer system of claim 6, wherein the first and second data transferors, first and second pattern sensors, an inversion information transferor, and the data receiving circuit are disposed within one integrated circuit chip.

16. The data transfer system of claim 6, wherein the first and second data transferors, first and second pattern sensors, an inversion information transferor, and the data receiving circuit are disposed in different integrated circuit chips.

17. A data transfer system comprising:

a data transferring circuit for transferring data through a plurality of parallel data transfer lines and a data receiving circuit for receiving data through the parallel data transfer lines, wherein the inverted transferred data includes data to be transferred through first two of the parallel data transfer lines in sequence or data to be transferred through last two of the parallel data transfer lines in sequence, and wherein, when data to be loaded on the parallel data transfer lines is to cause three sequential ones of the parallel data transfer lines to transfer data of a logic value through a middle one of the three sequential lines of the parallel data transfer lines and data of an inverse of the logic value to be transferred through remaining sequential lines of the parallel data transfer lines or cause all of the transfer lines to transfer data of a same logic value, the data transferring circuit is configured to partially invert the transferred data and transfer an inversion signal for informing a transfer of the inverted data through an inversion information transfer line, and the data receiving circuit is configured to receive transferred data through the data transfer lines, receive the inversion signal through the inversion information transfer line, and invert the inverted data received from the data transferring circuit in response to the inversion signal.

* * * * *